(12) United States Patent
Perez

(10) Patent No.: US 10,058,211 B2
(45) Date of Patent: Aug. 28, 2018

(54) SMOKELESS CONVECTION BARBECUE GRILL

(71) Applicant: Salvador Perez, Sanford, NC (US)

(72) Inventor: Salvador Perez, Sanford, NC (US)

( * ) Notice: Subject to any disclaimer, the term of this patent is extended or adjusted under 35 U.S.C. 154(b) by 273 days.

(21) Appl. No.: 14/975,592

(22) Filed: Dec. 18, 2015

(65) Prior Publication Data

US 2016/0348925 A1     Dec. 1, 2016

Related U.S. Application Data

(60) Provisional application No. 62/166,735, filed on May 27, 2015.

(51) Int. Cl.
*F24C 7/10* (2006.01)
*A47J 37/07* (2006.01)

(52) U.S. Cl.
CPC ............. *A47J 37/0709* (2013.01); *F24C 7/10* (2013.01)

(58) Field of Classification Search
CPC .................................. A47J 37/0709; F24C 7/10
See application file for complete search history.

(56) References Cited

U.S. PATENT DOCUMENTS

| | | | |
|---|---|---|---|
| 1,898,424 A | 2/1933 | Collins | |
| 2,505,175 A | 4/1950 | Burnett | |
| 2,728,334 A | 12/1955 | Paolella | |
| 4,023,943 A | 5/1977 | Kipple et al. | |
| 4,062,340 A | 12/1977 | Huff | |
| 5,320,086 A * | 6/1994 | Beal | F23J 13/025 126/512 |
| 5,404,801 A | 4/1995 | Holland | |
| 5,579,680 A | 12/1996 | Graur | |
| 5,676,045 A | 10/1997 | Faraj | |
| 5,863,310 A | 1/1999 | Brown et al. | |
| 5,910,209 A | 6/1999 | Lee | |
| 5,960,782 A | 10/1999 | Clements et al. | |
| 6,012,442 A | 1/2000 | Faraj | |
| 6,199,474 B1 | 3/2001 | Lee | |
| 6,263,784 B1 | 7/2001 | Wodeslaysky | |
| 6,698,419 B2 | 3/2004 | Lee | |
| 7,811,346 B1 | 10/2010 | Henson | |
| 8,381,638 B1 * | 2/2013 | Rhee | A47J 37/0754 99/426 |
| 2010/0089248 A1 | 4/2010 | Jones | |
| 2010/0206291 A1 * | 8/2010 | Axinte | A47J 36/025 126/25 R |
| 2012/0192726 A1 | 8/2012 | Clearman et al. | |

* cited by examiner

*Primary Examiner* — Alfred Basichas
(74) *Attorney, Agent, or Firm* — The Keys Law Firm PLLC

(57) ABSTRACT

A convection barbecue grill for grilling food with convection style circulated air includes a grill housing defining a grilling assembly sized as conventional barbecue grills, a heating and circulation assembly defining a heating element, a high temperature fan and a pair of duck and vent implements, and a filtration system which includes an air outlet and a filter. When in use, the fan is operative to blow air in a heating direction, which causes ambient air outside of the heating element to pass through the heating element and fan into the grill housing as well as air in the grill housing to be recirculated therethrough by way of the duck and vent implements. The filtration system is operative to filter air being outlet from the grill housing that is not being recirculated.

10 Claims, 1 Drawing Sheet

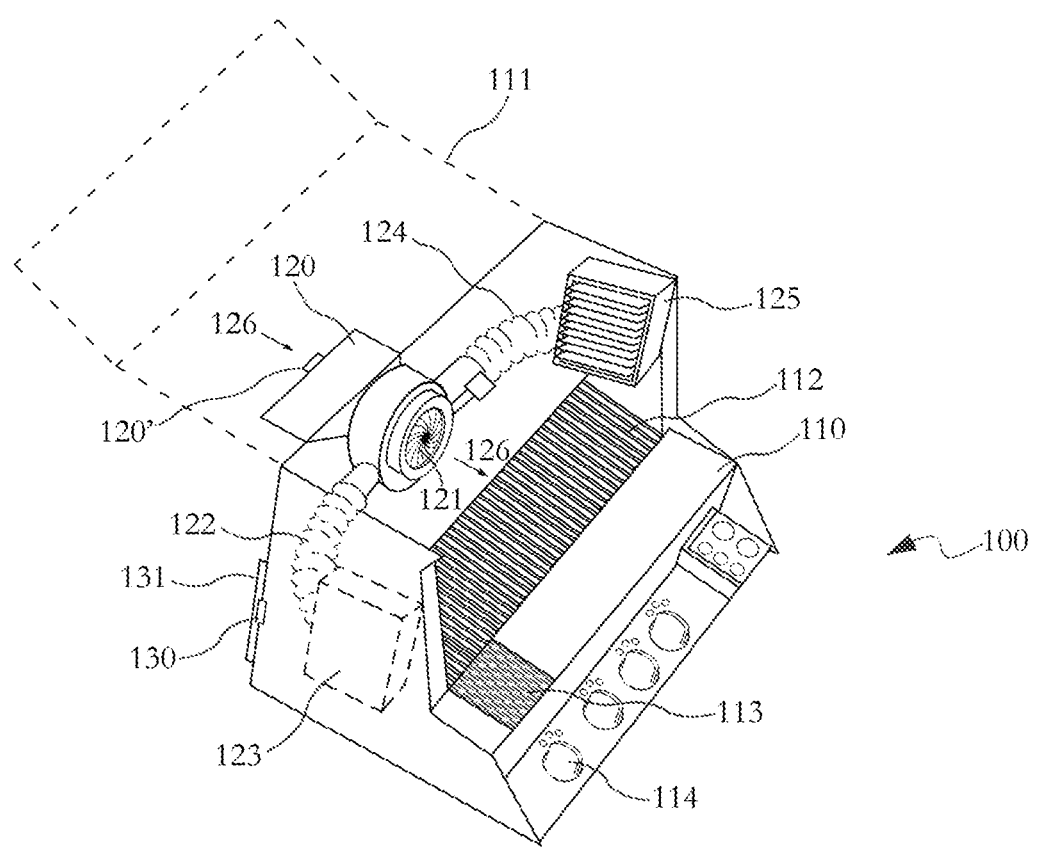

SMOKELESS CONVECTION BARBECUE GRILL

CROSS REFERENCE TO RELATED APPLICATIONS

This application claims the benefit of and incorporates by reference U.S. provisional patent application Ser. No. 62/166,735 filed May 27, 2015.

BACKGROUND OF THE INVENTION

Field of the Invention

This invention relates generally to grilling devices and, more particularly, to a barbecue grill integrated air circulation and filtration system for convection heat transfer therein.

Description of the Prior Art

The design and use of conventional barbecue grilling devices is well known. A problem which still exists, however, is that for barbecue grills, because direct heat is employed, constant attention is generally required to regulate the proper temperature and ensure even cooking of the food. Thus, there remains a need for a barbecue grill apparatus that employs an air circulation system that moves heated air to perform cooking as opposed to a direct or indirect heating arrangement. It would be helpful if such a convection barbecue grill included an integrated filtration system to minimize odors associated with cooking. It would be additionally desirable for such a convection barbecue grill to utilize a heating system that alleviated the need to flip or turn the food being cooked.

The Applicant's invention described herein provides for a convection barbecue grill adapted to allow a user to cook food therein solely through the convection style heat transfer. The primary components in Applicant's convection barbecue grill are a grill housing, a heating and circulation assembly, and a filtration system. When in operation, the convection barbecue grill enables more effective and efficient cooking while reducing the release of excessive odors generally present during barbecue style cooking. As a result, many of the limitations imposed by prior art structures are removed.

SUMMARY OF THE INVENTION

A convection barbecue grill for grilling food with convection style circulated air. The convection barbecue grill comprises a grill housing defining a grilling assembly sized as conventional barbecue grills, a heating and circulation assembly defining a heating element, a high temperature fan and a pair of duck and vent implements, and a filtration system which includes an air outlet and a filter. When in use, the fan is operative to blow air in a heating direction, which causes ambient air outside of the heating element to pass through the heating element and fan into the grill housing as well as air in the grill housing to be recirculated therethrough by way of the duck and vent implements. The filtration system is operative to filter air being outlet from the grill housing that is not being recirculated.

It is an object of this invention to provide a barbecue grill apparatus that employs an air circulation system that moves heated air to perform cooking as opposed to a direct or indirect heating arrangement.

It is another object of this invention to provide a convection barbecue grill which includes an integrated filtration system to minimize odors associated with cooking.

It is yet another object of this invention to provide a convection barbecue grill which utilizes a heating system that alleviated the need to flip or turn the food being cooked.

These and other objects will be apparent to one of skill in the art.

BRIEF DESCRIPTION OF THE DRAWINGS

FIG. 1 is a side perspective view of a convection barbecue grill built in accordance with the present invention with a hinged top shown.

DETAILED DESCRIPTION OF THE INVENTION

Referring now to the drawings and in particular FIG. 1, a convection barbecue grill 100 is shown having a grill housing 110, a heating and circulation assembly, and a filtration system. In the preferred embodiment, the grill housing 110 defines a grilling assembly sized as conventional barbecue grills and that includes a housing body with a hinged top 111, first grill grate 112, a second grill grate 113, and four adjustment knobs 114. The heating and circulation assembly defines a heating element 120, a high temperature fan 121, a left duck 122, a left vent 123, a right duct 124 and a right vent 125. The filtration system includes an air outlet 130 and a filter 131.

In operation, the output of the heating element 120 and the rotation of the fan 121 are each controlled separately by one of the knobs 114. The fan 121 is operative to blow air in a heating direction 126, which causes ambient air outside of the heating element 120 to enter an inlet 120' on the heating element 120 and pass through the heating element 120 and fan into the grill housing 110 over the grill grates 112, 113. The rotation of the fan also causes air to be pulled through the left duck 122 and right duct 124, thereby resulting in air from inside the grill housing 110 to be sucked into the left vent 123 and right vent 125, through the left duck 122 and right duct 124 (respectively), and then back through the fan 121 and into the grill housing 110.

Accordingly, when the heating element 120 is on, heated air can be forced into the grill housing 110 by the fan 121 and whether the heating element 120 is on or off at a given time, previously heated air can be recirculated through the grill housing 110 through the vents 123, 125, ducts 122, 124 and fan 121.

The filtration system is operative to filter air being outlet from the grill housing 110 that is not being recirculated. As such, when the hinged top 111 is in place fully or partially over the grill grates 112, 113, it is appreciated that air may be output from the air outlet 130. Such air is filtered by the filter 131 to minimize the cooking odors that escape into the ambient environment. In one embodiment, the air outlet 130 includes an air release valve operative to automatically enable air to escape as additional air is drawn into the grill housing 110 from the heating element 120.

It is contemplated that the heating element 120 may define a propane burner or an electric coil. In electrical heating element embodiments, a solar panel may be included on the grill housing 110 to supply electricity thereto.

It is appreciated that the intensity of the heat directed by the convection barbecue grill 100 can additionally be adjusted by increasing or decreasing the heat generated by the heating element 120.

In one embodiment, the heating element 120 is attached to the fan 121. In another embodiment, the heating element 120 is connected to the fan 121 through a conduit.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A convection barbecue grill, comprising:
a grill housing defining a grilling assembly having at least one cooking surface; and
a heating and circulation assembly integral with said grill housing and defining a heating element, a high temperature fan, and at least one duct and vent set, wherein said heating and circulation assembly is configured such that the output of the heating element and the rotation of the fan are each controlled separately;
wherein said fan is operative to create a current of air in a heating direction, thereby causing air from outside the grill housing to pass through the heating element and enter the grill housing;
wherein said at least one duct and vent set includes a vent positioned in the grill housing as well as a corresponding duct that is connected at one end to the vent such that that air which enters the vent of the at least one duct and vent set is directed to the corresponding duct and connected at the other end to the fan such that when a current of air is created in the heating direction, air which is inside the grill housing is pulled into the said vent of the at least one duct and vent set, through the corresponding duct and recirculated back into the grill housing.

2. The convection barbecue grill of claim 1, wherein said fan and said at least one duct and vent set are operatively connected such that when a current of air is created in the heating direction, air which is inside the grill housing is pulled into the said vent of the at least one duct and vent set, through the corresponding duct and directed back into the grill housing passing through the fan.

3. The convection barbecue grill of claim 1, wherein said heating and circulation assembly additionally includes a plurality of discrete duct and vent sets, each of which are operatively connected to the fan so as to operate independent of one another.

4. The convection barbecue grill of claim 1, wherein the creation of a current of air in the heating direction causes air from outside the grill housing to pass through the heating element and enter the grill housing passing through the fan.

5. A convection barbecue grill, comprising:
a grill housing defining a grilling assembly having at least one cooking surface;
a heating and circulation assembly integral with said grill housing and defining a heating element, a high temperature fan, and at least one duct and vent set, wherein said heating and circulation assembly is configured such that the output of the heating element and the rotation of the fan are each controlled separately;
wherein said fan is operative to create a current of air in a heating direction, thereby causing air from outside the grill housing to pass through the heating element and enter the grill housing;
wherein said at least one duct and vent set includes a vent positioned in the grill housing as well as a corresponding duct that is connected at one end to the vent such that that air which enters the vent of the at least one duct and vent set is directed to the corresponding duct and connected at the other end to the fan such that when a current of air is created in the heating direction, air which is inside the grill housing is pulled into the said vent of the at least one duct and vent set, through the corresponding duct and recirculated back into the grill housing; and
a filtration system integral with the grill housing and including an air outlet and a filter, wherein said air outlet operative to allow air to be output from inside the grill housing to outside the grill housing and said filter is operative to filter air which passes through the air outlet.

6. The convection barbecue grill of claim 5, wherein said fan and said at least one duct and vent set are operatively connected such that when a current of air is created in the heating direction, air which is inside the grill housing is pulled into the said vent of the at least one duct and vent set, through the corresponding duct and directed back into the grill housing passing through the fan.

7. The convection barbecue grill of claim 5, wherein said heating and circulation assembly additionally includes a plurality of discrete duct and vent sets, each of which are operatively connected to the fan so as to operate independent of one another.

8. The convection barbecue grill of claim 5, wherein the creation of a current of air in the heating direction causes air from outside the grill housing to pass through the heating element and enter the grill housing passing through the fan.

9. The convection barbecue grill of claim 5, wherein the air outlet is configured to automatically allow air to output as air is drawn into the grill housing.

10. A convection barbecue grill, comprising:
a grill housing defining a grilling assembly having at least one cooking surface;
a heating and circulation assembly integral with said grill housing and defining a heating element, a high temperature fan, and a pair of discrete duct and vent sets, wherein said fan is operative to create a current of air in a heating direction, thereby causing air from outside the grill housing to pass through the heating element and fan and enter the grill housing;
wherein each of said pair of discrete duct and vent sets is positioned on an opposing side of the grill housing and include a vent positioned in the grill housing as well as a corresponding duct that is (1) connected at one end to the vent such that that air which enters the vent is directed to the corresponding duct and (2) connected at the other end to the fan such that when a current of air is created in the heating direction, air which is inside the grill housing is pulled into the vent to which the corresponding duct is connected, through the corresponding duct and the fan, and recirculated back into the grill housing; and
a filtration system integral with the grill housing and including an air outlet and a filter, wherein said air outlet operative to automatically allow air to be output from inside the grill housing to outside the grill housing as air is drawn into the grill housing and said filter is operative to filter air which passes through the air outlet.

* * * * *